US008006033B2

(12) United States Patent
Bains

(10) Patent No.: US 8,006,033 B2
(45) Date of Patent: Aug. 23, 2011

(54) SYSTEMS, METHODS, AND APPARATUSES FOR IN-BAND DATA MASK BIT TRANSMISSION

(75) Inventor: Kuljit S. Bains, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 520 days.

(21) Appl. No.: 12/207,015

(22) Filed: Sep. 9, 2008

(65) Prior Publication Data

US 2010/0064100 A1    Mar. 11, 2010

(51) Int. Cl.
*G06F 13/00* (2006.01)
(52) U.S. Cl. .......... 711/105; 710/49; 711/104; 711/161; 711/162; 714/6.23
(58) Field of Classification Search .................. 710/49; 711/104, 105, 161, 162; 714/6.23
See application file for complete search history.

(56) References Cited

U.S. PATENT DOCUMENTS

| | | | |
|---|---|---|---|
| 2001/0039604 A1* | 11/2001 | Takahashi | 711/141 |
| 2004/0165446 A1 | 8/2004 | Riesenman et al. | |
| 2007/0061494 A1 | 3/2007 | Wallner et al. | |
| 2007/0061671 A1 | 3/2007 | Wallner et al. | |
| 2008/0062771 A1 | 3/2008 | Yoon | |

FOREIGN PATENT DOCUMENTS

| | | |
|---|---|---|
| WO | 2010/030561 A2 | 3/2010 |
| WO | 2010/030561 A3 | 6/2010 |

OTHER PUBLICATIONS

United States Patent Application, pending—not yet published, U.S. Appl. No. 11/758,248, filed Jun. 5, 2007, to Kuljit S. Bains.
United States Patent Application, pending—not yet published, U.S. Appl. No. 12/141,339, filed Jun. 18, 2007, to Kuljit S. Bains.
International Preliminary Report on Patentability received for PCT Patent Application No. PCT/US2009/055911, mailed on Mar. 24, 2011, 8 pages.
International Search Report and Written Opinion received for PCT Patent Application No. PCT/US2009/055911, mailed on Apr. 19, 2010, 14 pages.

* cited by examiner

*Primary Examiner* — Jae U Yu
(74) *Attorney, Agent, or Firm* — Philip A. Pedigo

(57) ABSTRACT

Embodiments of the invention are generally directed to systems, methods, and apparatuses for in-band data mask bit transmission. In some embodiments, one or more data mask bits are integrated into a partial write frame and are transferred to a memory device via the data bus. Since the data mask bits are transferred via the data bus, the system does not need (costly) data mask pin(s). In some embodiments, a mechanism is provided to enable a memory device (e.g., a DRAM) to check for valid data mask bits before completing the partial write to the DRAM array.

7 Claims, 5 Drawing Sheets

FIG. 5

| | 0a | 1a | 2a | 3a | 4a | 5a | 6a | 7a |
|---|---|---|---|---|---|---|---|---|
| ¤ | Byte 0a | Byte 1a | Byte 2a | Byte 3a | Transfers | | | |
| DQ0a | | | | | DM0_aa | DM0_ba | DM0_ca | DM0_da |
| DQ1a | | | | | DM1_aa | DM1_ba | DM1_ca | DM1_da |
| DQ2a | | | | | DM2_aa | DM2_ba | DM2_ca | DM2_da |
| DQ3a | | | | | DM3_aa | DM3_ba | DM3_ca | DM3_da |
| DQ4a | | | | | RFUa | RFUa | RFUa | RFUa |
| DQ5a | | | | | RFUa | RFUa | RFUa | RFUa |
| DQ6a | | | | | RFUa | RFUa | RFUa | RFUa |
| DQ7a | | | | | RFUa | RFUa | RFUa | RFUa |

| | 0a | 1a | 2a | 3a | 4a | 5a | 6a | 7a |
|---|---|---|---|---|---|---|---|---|
| ¤ | Byte 4a | Byte 5a | Byte 6a | Byte 7a | Transfers | | | |
| DQ8a | | | | | DM4_aa | DM5_ba | DM6_ca | DM7_da |
| DQ9a | | | | | DM4_aa | DM5_ba | DM6_ca | DM7_da |
| DQ10a | | | | | DM4_aa | DM5_ba | DM6_ca | DM7_da |
| DQ11a | | | | | DM4_aa | DM5_ba | DM6_ca | DM7_da |
| DQ12a | | | | | RFUa | RFUa | RFUa | RFUa |
| DQ13a | | | | | RFUa | RFUa | RFUa | RFUa |
| DQ14a | | | | | RFUa | RFUa | RFUa | RFUa |
| DQ15a | | | | | RFUa | RFUa | RFUa | RFUa |

500

SYSTEMS, METHODS, AND APPARATUSES FOR IN-BAND DATA MASK BIT TRANSMISSION

TECHNICAL FIELD

Embodiments of the invention generally relate to the field of integrated circuits and, more particularly, to systems, methods and apparatuses for in-band data mask bit transmission.

BACKGROUND

A host (e.g., a memory controller) may perform partial writes to a dynamic random access memory device (DRAM) in which one or more of the bytes of write data are masked. In conventional systems (e.g., double data rate (DDR)1, DDR2, and DDR3), one or more dedicated data mask pins are used to transfer the data mask bits. Typically, the data mask pins are toggling at the same frequency as the data pins (e.g., on the data bus). A conventional system typically uses one data mask signal per byte lane of data. Thus, a x4 or a x8 device may have one data mask pin and a x16 device may have two data mask pins.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5 illustrates an example of a partial write frame suitable for use with a x16 device according to some embodiments of the invention.

DETAILED DESCRIPTION

Embodiments of the invention are generally directed to systems, methods, and apparatuses for in-band data mask bit transmission. In some embodiments, one or more data mask bits are integrated into a partial write frame and are transferred to a memory device via the data bus. Since the data mask bits are transferred via the data bus, the system does not need (costly) data mask pin(s). In some embodiments, a mechanism is provided to enable a memory device (e.g., a DRAM) to check for valid data mask bits before completing the partial write to the DRAM array. This mechanism alleviates the need for additional staging of the data. As is further described below, a cyclic redundancy check (CRC) can be done in parallel. This CRC check need not gate the writing of the data to the array.

The increasing transfer rate of memory channels (e.g., DRAM channels) increases the risk of transmission errors in the transferred data. These transmission errors may be mitigated by using CRC error bits to cover the DRAM data frames. For example, 8 bits of CRC may cover 64 bits of data to obtain the desired bit error rate (BER). In conventional systems that use separate data mask pins, the data mask bits are typically not covered by CRC even though the data mask pins are toggling at the same rate as the data pins.

The data mask bits may be incorporated into the data frames to provide CRC coverage of the data mask bits. This approach, however, presents a problem because it creates separate write pipelines for "normal" writes and partial writes. Normal (or full) writes do not need to be qualified by a valid CRC checksum to be written to the DRAM core. Instead, normal writes are written to the DRAM core and a CRC check is done in parallel with completing the write. If an error is detected, then an error message is provided to the controller and the controller retries the write transaction. If bad data was initially written to the DRAM core, then the bad data is simply overwritten when the controller retries the write transaction.

This approach cannot be used for partial writes, however, because there is a risk that good data will be overwritten in the DRAM array. If there is an error in a data mask bit (e.g., a data mask bit is changed from 1 to 0 as a result of a signaling/link error) then the DRAM will not mask the corresponding byte and good data will be overwritten in the array. The CRC checksum may be used to qualify a partial write before it is completed. This, however, presents the problem of having different write pipelines for normal writes and partial writes. The different write pipelines increase the cost and complexity of the DRAM. It also creates two different write latency timings and requires the staging of data in the DRAM. An alternative approach to qualifying partial writes is discussed below with reference to FIGS. 1-6.

Figure 1:
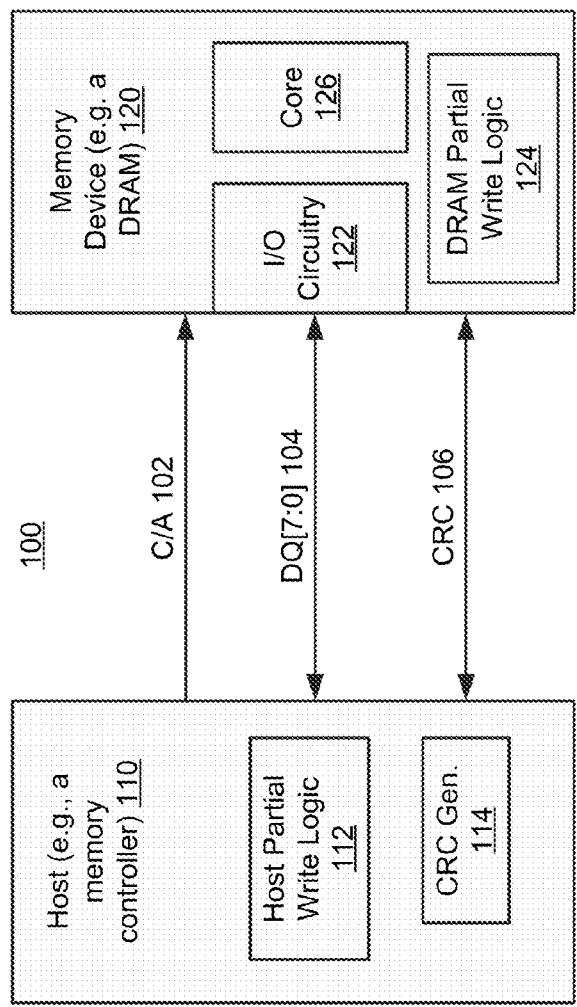
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. In the illustrated embodiment, system 100 includes host 110 (e.g., a memory controller) and memory device 120 (e.g., a dynamic random access memory device or DRAM). In alternative embodiments, system 100 may include more elements, fewer elements, and/or different elements.

Command/Address (C/A) lanes 102 provide a plurality of lanes for sending commands and addresses to memory device 120. DQ lanes 104 provide a bi-directional read/write data bus. CRC lanes 106 provide a bi-directional bus to transfer CRC checksum bits. In alternative embodiments, DQ lanes 104 and/or CRC lanes 106 may be unidirectional. For ease of description, embodiments of the invention are described with reference to a x8 memory device. It is to be appreciated, however, that embodiments of the invention may include other device data widths such as x4, x16, x32, etc.

Host 110 controls the transfer of data to and from memory device 120. Host 110 includes partial write logic 112 (or, for ease of description, logic 112). Logic 112 enables host 110 to transmit one or more data mask bits in a write data frame. In some embodiments, logic 112 provides a mechanism to enable memory device 120 to determine whether the data mask bits are valid before completing the partial write to the DRAM array. For example, the same data mask bits may be transferred in more than one unit interval (UI). Memory device 120 may then compare the multiple instances of the same data mask bit (or bits) to determine whether they match. If they do match, then the data mask bits are likely valid and the partial write can be completed without the need for the CRC to gate the completion of the partial write. This approach is further described below with reference to FIGS. 2-6. For ease of illustration, logic 112 is illustrated as a single block of logic. It is to be appreciated, however, that the functions provided by logic 112 may be performed by logic that is not necessarily collocated on host 110.

In some embodiments, host 110 encodes a partial write command (e.g., Wm) if the write frame includes data mask bits and encodes a "normal" write (e.g., W) if the write frame does not include data mask bits. The term "partial write frame" refers to a write frame that includes one or more data mask bits to mask at least a portion of the "partial write frame." Host 110 does not need a data mask pin (or pins) because the data mask bits are conveyed over the data bus (e.g., 104) with a partial write frame. In addition, since the data mask bits are conveyed with the data bits, they may be protected by the cyclic redundancy check (CRC) checksum that protects the data bits. Examples of partial write data frames are further discussed with reference to FIGS. 2-8. In some embodiments, host 110 is integrated onto the same die as one or more processors.

Host 110 may also include CRC generator 114. In systems that support the use of CRC, CRC generator 114 generates a local CRC that can be compared with a CRC checksum from memory device 120 to determine whether transmitted data has been corrupted. In addition, a CRC is generated for write transactions and sent to the memory device in the write frame (in systems that support the use of CRC).

Memory device 120 provides (at least a portion of) main system memory for system 100. In some embodiments, memory device 120 is a dynamic random access memory device (DRAM). Memory device 120 includes, inter alia, input/output (I/O) circuitry 122, partial write logic 124 (or, for ease of reference, logic 124), and core 126 (e.g., a memory array). I/O circuitry 122 includes circuitry suitable for receiving and/or transmitting signals over one or more interconnects (such as C/A 102, DQ 104, and/or CRC 106). For ease of illustration, I/O circuitry 122 is illustrated as a single block of logic. It is to be appreciated, however, that the functions provided by I/O circuitry 122 may be performed by logic that is not necessarily collocated on memory device 120.

Logic 124 enables memory device 120 to write either a normal write frame (e.g., without data mask bits) or a partial write frame (e.g., with data mask bits) to core 126. Logic 124 may decode a transaction as either a normal write (W) or a partial write (Wm). If the transaction is a Wm, then logic 124 uses the data mask bits provided by the partial write frame to mask selected data bits within the partial write frame. Selected aspects of logic 124 are further discussed below with reference to FIGS. 3 and 4.

Figures 2, 3:
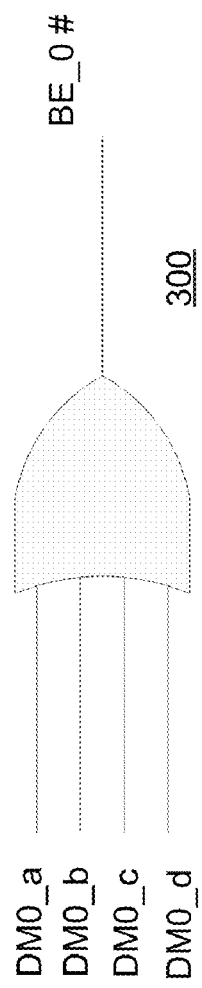
FIG. 2 illustrates one example of a partial write frame format, according to an embodiment of the invention.
FIG. 3 illustrates selected aspects of DRAM partial write logic according to some embodiments of the invention.

FIG. 2 illustrates one example of a partial write frame format, according to an embodiment of the invention. In the illustrated embodiment, the data bus is eight bits wide (e.g., DQ[7:0]) and each write frame has eight unit interval (UI) transfers (e.g., UI0-UI7). In alternative embodiments, the data bus may have a different width (e.g., 4, 16, 32, etc.) and/or frame 200 may have a different number of UIs.

Typically, partial write transactions convey bytes, words, or Dwords (e.g., double words). Thus, most partial writes use only four (or fewer) UIs to convey data. This is similar to a burst length of four modes (e.g., as implemented in double data rate (DDR) 3). Bytes four through seven can be transferred in the first UIs by issuing a write CAS command with bit "A2" equal to one. Write CAS with bit A12 equal to zero implies a burst length of BL8. Similarly, a write CAS command with bit "A12" equal to one implies a burst length of BL4. BL4 transactions with "A2" equal to zero implies that bytes zero through three are transferred. A BL4 transaction with A2 equal to one implies that bytes four through seven are transferred in the first four UI of the partial write frame.

In some embodiments, a new command encoding is defined to state whether a write is a partial write or a full write. For example, the command encoding for partial writes may be "Wm." Similarly, the command encoding for full writes may be "W." Frame 200 illustrates one example of a partial write (Wm) frame. Frame 200 conveys partial write data in UIs zero through three. Data mask bits corresponding to the write data are transferred over the last four UIs.

In some embodiments, the same data mask bits are conveyed in more than one UI of frame 200. The DRAM that receives frame 200 compares the multiple instances of the data mask bit (or bits) to determine whether they match. If they match then the data mask bit is (or bits are) valid. If they do not match then the data mask bit is (or bits are) invalid. This approach enables the DRAM to qualify partial write frame 200 without using the CRC checksum (which may be computed in parallel) to gate the completion of the partial write operation.

Frame 200 includes partial write data bytes 0-3 in UIs 0-3. In addition, frame 200 includes DM0-DM3 in each of UIs 4-7. Allowing DMn to represent a general data mask bit, then, if all of the instances of DMn are equal to 1, then the corresponding Byte-n is masked. Thus, if DM0_a, DM0_b, DM0_c, and DM0_d are each equal to 1, then byte 0 is masked. The unused portions of frame 200 are marked "reserved for future use" (RFU).

In alternative embodiments, frame 200 may have a different structure and yet still contain more than one instance (or copy) of at least one data mask bit. For example, frame 200 may have more than eight UIs or fewer than eight UIs. The data bytes and/or the data mask bits may be located nearly anywhere in frame 200 (e.g., in the beginning, at the end, interleaved, etc.). Also, in some alternative embodiments, the order of the data mask bits may vary from one UI to another.

FIG. 3 illustrates selected aspects of DRAM partial write logic (e.g., 124, shown in FIG. 1) according to some embodiments of the invention. In some embodiments, an OR gate (e.g., OR gate 300) is used to generate the byte enables for the DRAM core. A zero on BE_0# implies that the corresponding byte is enabled and can be written to the DRAM core. The inputs to OR gate 300 (e.g., DM0_a through DM0_b) are the multiple instances (or copies) of the DM0 from the partial write data frame (e.g., frame 200, shown in FIG. 2). OR gate logic 300 illustrates the gating logic for a single byte. It is to be appreciated that each byte may have an instance of similar logic. In alternative embodiments, different logic may be used in the DRAM to generate the byte enables.

Figure 4:
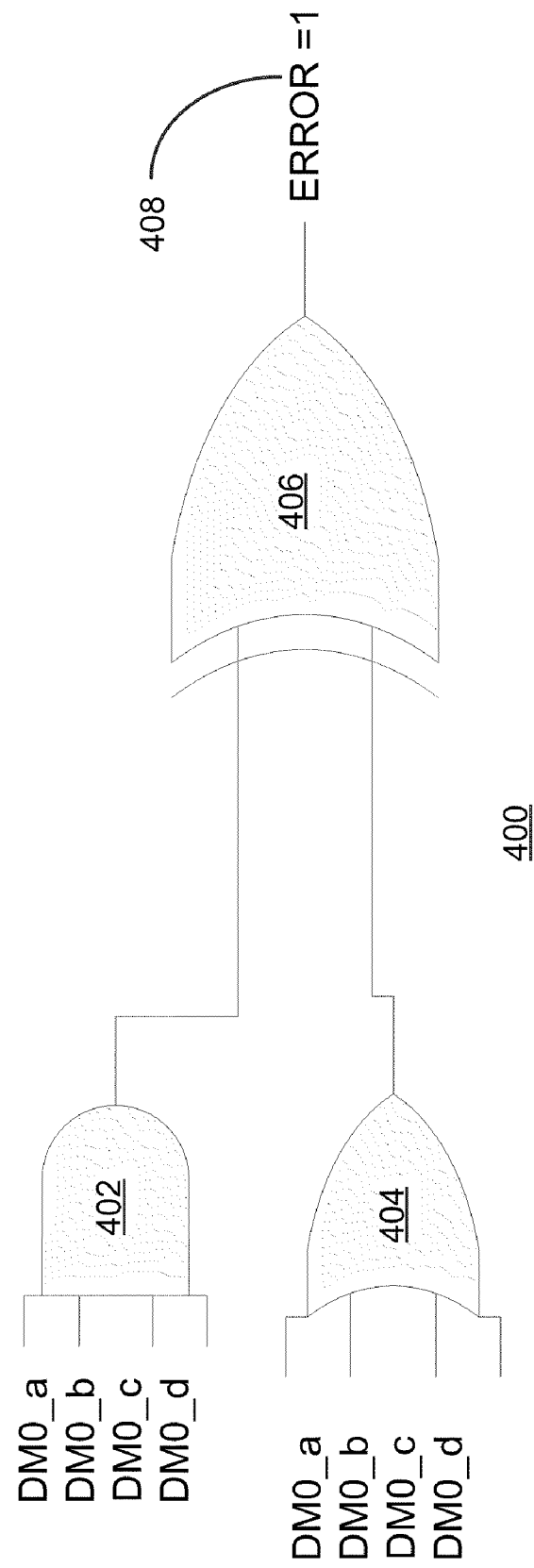
FIG. 4 is an example of error reporting logic according to some embodiments of the invention.

In some embodiments, the CRC check is done in parallel with the byte enable generation. If the CRC check detects an error (or errors) then it is (or they are) reported to the controller (e.g., host 110, shown in FIG. 1). FIG. 4 is an example of error reporting logic 400 according to some embodiments of the invention. Logic 400 includes AND gate 402, OR gate 404, and XOR gate 406. In operation, DMn_a through DMn_b are provided as inputs to AND gate 402 and OR gate 404. If all of the values of DMn_a through DMn_b are the same (e.g., either all ones or all zeros) then the inputs to XOR 406 are the same and, thus, the output of XOR 406 is zero (no error detected). On the other hand, if at least one of DMn_a through DMn_b is not the same as the others, then the inputs to XOR 406 are not the same and the output of XOR 406 goes high to indicate an error condition (e.g., 408). ERROR signal 408 may be routed to the controller so that the partial write operation is retried.

The embodiments of the invention discussed with reference to FIGS. 1-4 were directed to x8 memory devices. In alternative embodiments, the memory device may have a different width (e.g., x16, x4, and the like). FIG. 5 illustrates an example of a partial write frame suitable for use with a x16 device according to some embodiments of the invention. Frame 500 has a format that is similar to frame 200 (shown in FIG. 2) except that the format used for DQ0-DQ7 is duplicated for DQ8-DQ15 as shown in FIG. 5. Table 1 maps data mask bits (DM) to bytes for frame 500. In alternative embodiments, a different frame format may be used.

TABLE 1

| Data Mask Bit | Which Byte Covered |
|---|---|
| DM0 | Byte 0 |
| DM1 | Byte 1 |
| DM2 | Byte 2 |
| DM3 | Byte 3 |
| DM4 | Byte 4 |
| DM5 | Byte 5 |
| DM6 | Byte 6 |
| DM7 | Byte 7 |

Figure 6:
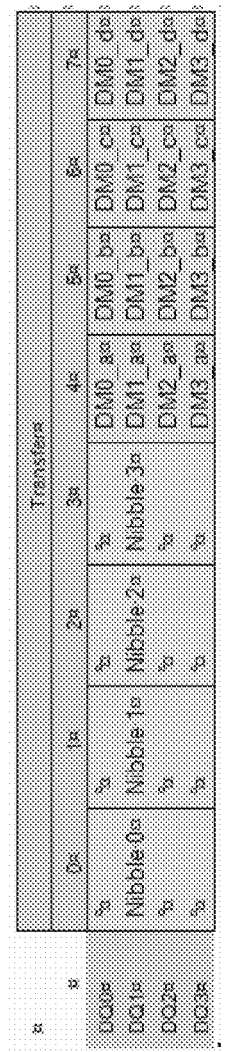
FIG. 6 illustrates an example of a partial write frame suitable for use with a x4 device according to some embodiments of the invention.

FIG. 6 illustrates an example of a partial write frame suitable for use with a x4 device according to some embodiments of the invention. Frame 600 has a format that is similar to frame 200 (shown in FIG. 2) except that UIs 0-3 transfer a nibble instead of a byte. In such embodiments, DMn_a through DMn_d cover the corresponding nibble. Table 2 maps data mask bits (DM) to nibbles for frame 600. In alternative embodiments, a different frame format may be used.

TABLE 2

| Data Mask Bit | Which Nibble Covered |
|---|---|
| DM0 | Nibble 0 |
| DM1 | Nibble 1 |
| DM2 | Nibble 2 |
| DM3 | Nibble 3 |

Figure 7:
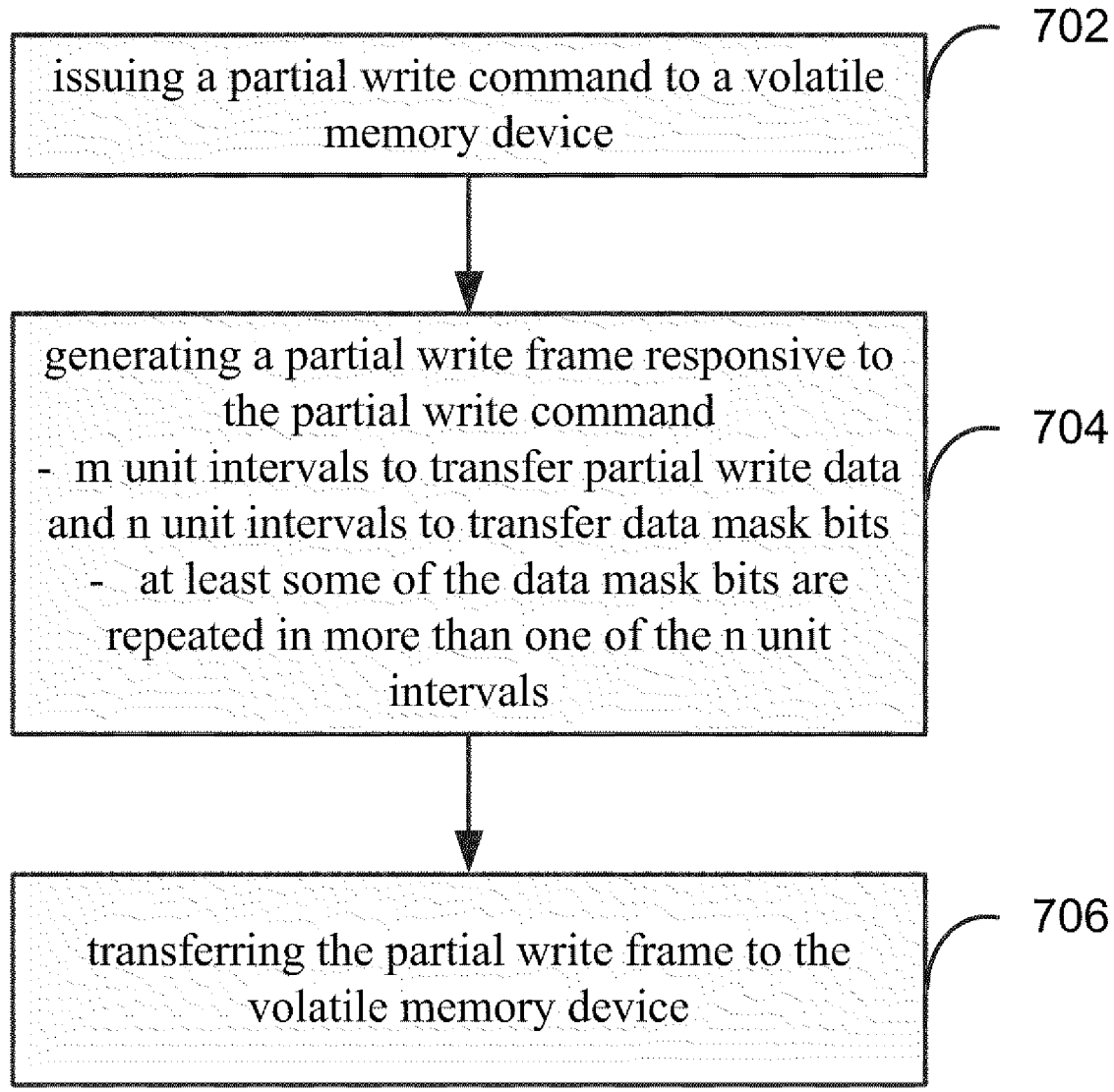
FIG. 7 is a flow diagram illustrating selected aspects of a method for transmitting data mask bits to a memory device, according to an embodiment of the invention.

FIG. 7 is a flow diagram illustrating selected aspects of a method for transmitting data mask bits to a memory device, according to an embodiment of the invention. Referring to process block 702, a host (e.g., host 110, shown in FIG. 1) issues a partial write command (e.g., Wm) to a memory device (e.g., memory device 120, shown in FIG. 1). In some embodiments, the host is a memory controller and the memory device is a DRAM.

Referring to process block 704, the host generates the partial write frame responsive to the partial write command. In some embodiments, the partial write frame includes m unit intervals to transfer partial write data. The partial write frame may also include n unit intervals to transfer data mask bits corresponding to the partial write data. In some embodiments, at least some of the data mask bits are repeated in more than one of the n unit intervals. Referring to frame 200 in FIG. 2 as an example, each of UIs 4-7 include a copy of DM0_a through DM0_d. The DRAM receiving the partial write frame may compare the multiple instances of DM0_a through DM0_d to determine whether a signaling error has occurred.

The host transfers the partial write frame to the memory device in 706. In some embodiments, the memory device is a DRAM. In alternative embodiments, the memory device may be something other than a DRAM (e.g., SRAM and the like).

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An integrated circuit comprising:
   logic to issue a partial write command to a volatile memory device; and
   logic to generate a partial write frame responsive to the partial write command, wherein the partial write frame includes m unit intervals to transfer partial write data and n unit intervals to transfer data mask bits and further wherein at least some of the data mask bits are repeated in more than one of the n unit intervals, wherein each of the n unit intervals includes a copy of the data mask bits, wherein each of the m unit intervals includes a byte of partial write data, wherein each of the n unit intervals includes a data mask bit corresponding to each of the m bytes of partial write data, wherein m is four and n is four.

2. The integrated circuit of claim 1, wherein the integrated circuit comprises a memory controller.

3. The integrated circuit of claim 2, wherein the volatile memory device comprises a random access memory device.

4. A method comprising:

issuing a partial write command to a volatile memory device;

generating a partial write frame responsive to the partial write command, wherein the partial write frame includes m unit intervals to transfer partial write data and n unit intervals to transfer data mask bits and further wherein at least some of the data mask bits are repeated in more than one of the n unit intervals; and transferring the partial write frame to the volatile memory device, wherein each of the n unit intervals includes a copy of the data mask bits, wherein each of the m unit intervals includes a byte of partial write data, wherein each of the n unit intervals includes a data mask bit corresponding to each of the m bytes of partial write data, wherein m is four and n is four.

5. The method of claim 4, wherein the volatile memory device comprises a random access memory device.

6. A system comprising:

a host including logic to issue a partial write command to a dynamic random access memory device, and logic to generate a partial write frame responsive to the partial write command, wherein the partial write frame includes m unit intervals to transfer partial write data and n unit intervals to transfer data mask bits and further wherein at least some of the data mask bits are repeated in more than one of the n unit intervals; and the dynamic random access memory device to receive the partial write data frame, wherein each of the n unit intervals includes a set of the data mask bits and each of the m unit intervals includes a byte of partial write data, wherein each of the n unit intervals includes a data mask bit corresponding to each of the m bytes of partial write data, wherein m is four and n is four.

7. The system of claim 6, wherein the dynamic random access memory device includes:

a memory core;

input/output logic coupled with the memory core, the input/output logic capable of receiving the partial write frame; and enable logic coupled with the input/output logic, the enable logic to enable a write to the memory core based, at least in part, on whether the n data mask bit sets match.

* * * * *